(12) United States Patent
Brusso et al.

(10) Patent No.: US 7,983,978 B2
(45) Date of Patent: Jul. 19, 2011

(54) FOREIGN CURRENCY INDEX

(75) Inventors: Scott Brusso, Oak Park, IL (US); Sayee Srinivasan, Elmhurst, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 3095 days.

(21) Appl. No.: 10/358,644

(22) Filed: Feb. 5, 2003

(65) Prior Publication Data

US 2004/0098334 A1     May 20, 2004

Related U.S. Application Data

(60) Provisional application No. 60/422,766, filed on Oct. 31, 2002.

(51) Int. Cl.
*G06Q 40/00* (2006.01)
(52) U.S. Cl. .......................................... 705/37
(58) Field of Classification Search .................... None
See application file for complete search history.

(56) References Cited

U.S. PATENT DOCUMENTS
6,317,727 B1 * 11/2001 May ............................ 705/36 R

OTHER PUBLICATIONS

New Summary Measures of the Foreign Exchange Value of the Dollar, Michael P. Leahy, Federal Reserve Bulletin, Oct. 1998.*
Industrial Production and Capacity Utilization: Historical Revision and Recent Developments, Carol Corrado, Federal Reserve Bulletin, Feb. 1997.*
Dictionary of Finance and Investment Terms, John Downes and Jorden Elliot Goodman, p. 741, definition of Trading pattern.*
Indexes of the Foreign Exchange Value of the Dollar, Mico Loretan, Federal Reserve Bulletin, Winter 2005.*
Geometric Mean, Wikipedia, http://en.wikipedia.org/wiki/Geometric_mean.*
Index No. Theory and Measurement Economics by W.E. Diewert, Dec. 2007; http://www.econ.ubc.ca/diewert/580ch9.pdf.*
Rules and Regulations of the Chicago Board of Trade, Chapter 20, Jun. 1993.
Notice Announcing the Commencement of Open Outcry Trading in the U.S. Dollar Index Futures, Chicago Board of Trade, May 23, 1993.
Summary of Daily Volume and Open Interest U.S. Dollar Composite Index Futures Contract, New York Board of Trade, Sep. 1993.

* cited by examiner

Primary Examiner — Rajesh Khattar
(74) Attorney, Agent, or Firm — Banner & Witcoff, Ltd.

(57) ABSTRACT

Systems and methods are provided for trading and calculating the composition of foreign currencies indexed financial instruments. The compositions of the financial instruments are determined by calculating a geometric average of the exchange rates of foreign currencies with corresponding competitive weights. The competitive weights for each of the foreign currencies reflects competition between the goods of the United States and a country corresponding to the foreign currency in the markets of third countries.

18 Claims, 2 Drawing Sheets

FOREIGN CURRENCY INDEX

This application relates to and claims priority from U.S. Provisional Application Ser. No. 60/422,766, filed Oct. 31, 2002, the entire disclosure of which is hereby incorporated by reference.

FIELD OF THE INVENTION

The present invention relates to foreign currency index financial instruments. More particularly, the invention relates to foreign currency index financial instruments that have a value determined by a trade weighted geometric average of currency prices

DESCRIPTION OF THE RELATED ART

Foreign currency indexes have been used for a variety of purposes, such as aids in analyzing the price competitiveness of domestic goods relative to foreign goods, the effect of foreign economic and financial development on the domestic price level, and the demand for domestic and foreign currency assets. Conventional indexes have included weighted formulas that are functions of exchange rates.

The well-known G-10 (Group of Ten) index maintained by the Board of Governors of the U.S. Federal Reserve System was designed principally to measure competitiveness in world markets. The G-10 index is a function of six currency values and corresponding weights. The weights were fixed in 1976 and have not been adjusted to reflect current conditions.

The Board of Governors of the U.S. Federal Reserve System replaced the G-10 index with a set of new indexes, including the Major Currency Index. The Major Currency Index was designed principally to measure competitiveness in world markets and to serve as a gauge of financial pressures on the U.S. dollar. The index uses weights that are aggregates of three sub-measures. The three sub-measures are: competition between the goods of the U.S. and country k in the U.S.; competition between the goods of the U.S. and country k in the home market of country k; and competition between the goods of the U.S. and country k in the markets of third countries. The relative weights are typically calculated annually by the Board of Governors of the U.S. Federal Reserve System.

The recalculation of weights with the Major Currency Index makes the Major Currency Index an improvement over the G-10 index. However, the weights used in calculating the Major Currency Index do not result in the Index reflecting current foreign currency trading patterns in the international foreign exchange markets sufficiently to allow the index to form the basis of desirable futures and options contracts.

Therefore, there is a need in the art for a foreign currency index that includes weights that change as conditions change between the U.S. and other countries and that reflects current foreign currency trading patterns sufficiently to allow the index to form the basis of desirable futures and options contracts.

SUMMARY OF THE INVENTION

The present invention overcomes the problems and limitations of the prior art by providing methods and systems that calculate the value of financial instruments as a function of exchange rates between a group of countries and individual competitive weights that each reflect competition between the goods of the United States and a given country in the markets of third countries. The competitive weights may correspond to the competitive weights published by the Federal Reserve and that are used by the Federal Reserve to calculate weights used with the Major Currency Index.

In one embodiment of the invention, a method of calculating the composition of a foreign currencies indexed financial instrument is provided. The method includes determining exchange rates for a group of foreign currencies and determining competitive weights for each of the foreign currencies such that each weight reflects competition between the goods of the United States and a country corresponding to the foreign currency in the markets of third countries. Next, a geometric average of the exchange rates with corresponding competitive weights is calculated.

In one implementation of the first embodiment of the invention, the currencies used in the calculation are: the European Union euro, the Australian dollar, the Canadian dollar, the Japanese yen, the Swedish krona, the Swiss franc, and the United Kingdom pound.

In another embodiment of the invention, a method of trading a foreign currencies indexed financial instrument is provided. The method includes listing for trading on an exchange a financial instrument having a composition calculated by the method of the first embodiment of the invention. Bids and offers for the financial instrument are received and matched.

In certain embodiments of the invention, the index may be used to calculate the values of futures and options contracts.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
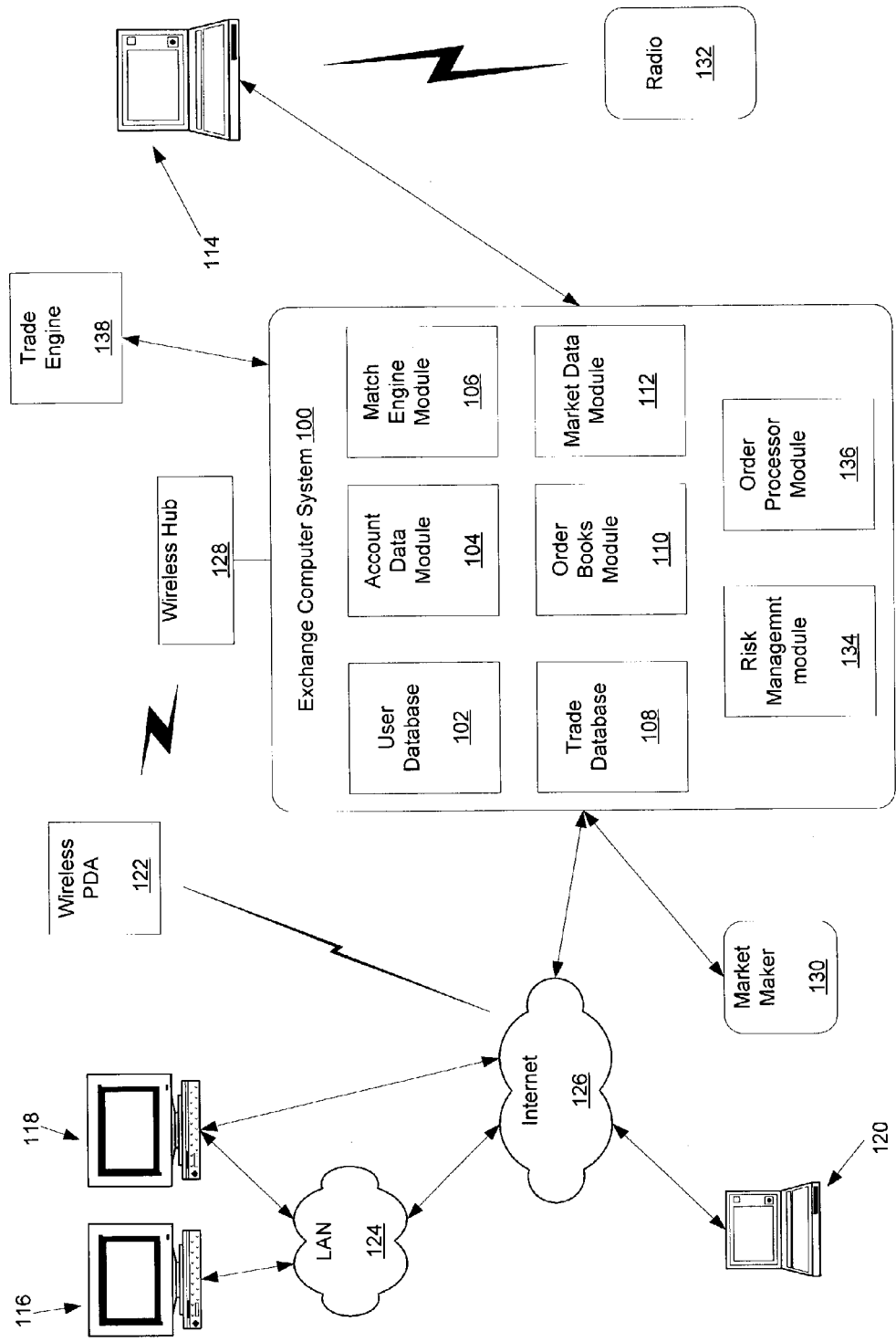
FIG. 1 shows a computer network system that may be used to implement aspects of the present invention.

Aspects of the present invention may be implemented with computer devices and computer networks that allow users to exchange trading information. In particular, a trading network environment may be used to exchange and match bids and offers for the disclosed financial instruments. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to process orders for further processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
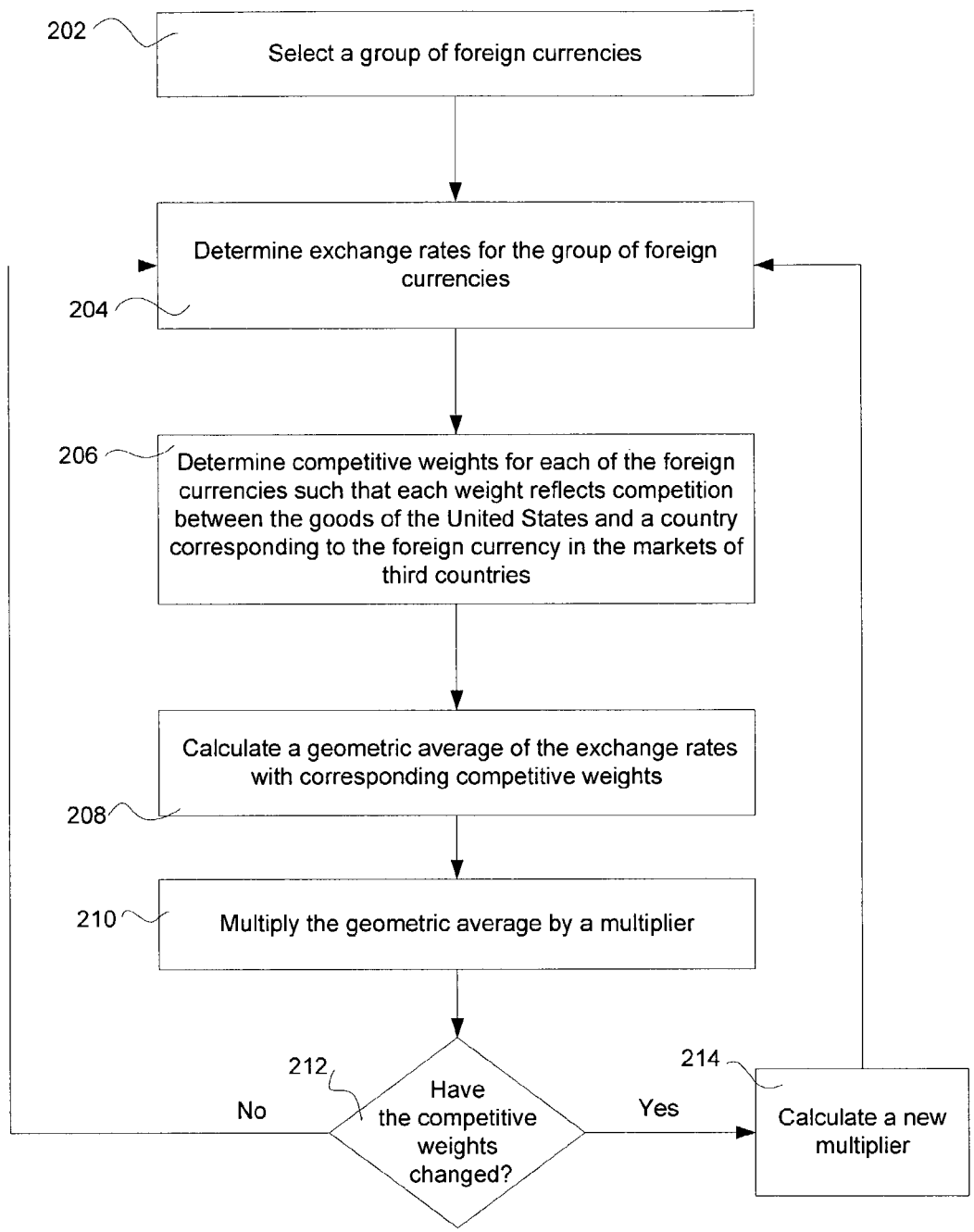
FIG. 2 shows a method of calculating the composition of a financial instrument in accordance with an embodiment of the invention.

FIG. 2 illustrates a method of determining the composition of a financial instrument in accordance with an embodiment of the invention. The financial instrument may be a foreign currencies indexed financial instrument that is a function of exchange rates between a group of countries and individual competitive weights that each reflect competition between the goods of the U.S. and a given country in the markets of third countries.

A group of foreign currencies may be selected in step 202. In one embodiment of the invention, the foreign currencies consist of the European Union euro, the Australian dollar, the Canadian dollar, the Japanese yen, the Swedish krona, the Swiss franc, and the United Kingdom pound. Of course additional or alternative currencies may be selected in other embodiments of the invention. For example, a new base currency may be one of the European Union euro, the Australian dollar, the Canadian dollar, the Japanese yen, the Swedish krona, the Swiss franc, and the United Kingdom pound and the foreign currencies may include the U.S. dollar and the remaining six currencies. In yet another embodiment, all 27 currencies for which the Board of Governors of the U.S. Federal Reserve System calculates trade weights may be used. Different financial instruments may be created by using any one of the 27 currencies as a base currency.

Next exchange rates for the group of foreign currencies are determined in step 204. Step 204 may be performed by consulting any of the conventional sources of foreign currency exchange rate data.

In step 206 competitive weights for each of the foreign currencies are determined. Each of the competitive weights reflects the competition between the goods of the United States and a country corresponding to the foreign currency in the markets of third countries. In one embodiment of the invention, competitive weights correspond to the competitive weights published by the Federal Reserve and used to calculate weights used with the Major Currency Index. The competitive weights published by the Federal Reserve can be found on the Internet at http://www.federalreserve.gov/releases/H10/weights/. Step 206 may also include scaling the competitive weights so that the weights sum to 100. The following table illustrates the values published by the Federal Reserve for the year 2002 and the corresponding scaled values.

|  | Value Published by the Federal Reserve | Scaled Competitive weight |
| --- | --- | --- |
| European Union euro | 17.816 | 38.4015 |
| Australian dollar | 1.977 | 4.2614 |
| Canadian dollar | 1.894 | 4.0824 |
| Japanese yen | 15.863 | 34.1919 |
| Swedish krona | 1.350 | 2.9099 |
| Swiss franc | 3.346 | 7.2121 |
| United Kingdom pound | 4.148 | 8.9408 |

Of course, in embodiments that do not use the U.S. dollar as a base currency, the competitive weights would be determined appropriately so that each competitive weight reflects the competition between the goods of the base country and another country corresponding to the foreign currency in the markets of third countries.

The competitive weights may also be rounded to four decimal places and adjusted to ensure the weights sum to 100. In accordance with one embodiment of the invention, if after rounding to four decimal places the sum of the weights is greater than 100, the 5th decimal points (when rounded to the fifth decimal place) of the competitive weights are reviewed and currencies that are eligible for rounding up are identified. Of those identified, one currency may be selected at random and an appropriate amount subtracted from it to force the sum of the competitive weights to 100. If the initial sum of the competitive weights is less than 100, the 5th decimal points (when rounded to the fifth decimal place) of the competitive weights are reviewed and currencies that are eligible for rounding down are identified. Of those identified, one currency may be selected at random and an appropriate amount added to it to force the sum to 100.

In step 208, a geometric average of the exchange rates with corresponding competitive weights is calculated. In the examples that follow, the competitive weights will be assumed to be scaled and rounded competitive weights. In one embodiment of the invention, the geometric average may be calculated with the following equation:

$$\prod_{i=1}^{7} (1/S_{i,t})^{w_{i,t}} \quad (1)$$

where $$\prod_{k=1}^{n} (x_k)$$

is the product of $x_k$ as k ranges from 1 to n, $S_{i,t}$ is the exchange rate of currency i at time t, expressed in dollars per unit of foreign currency and $w_{i,t}$ is the competitive weight of currency i at time t.

Next, in step 210, the geometric average may be multiplied by a multiplier $B_t$. $B_t$ is a multiplier that will be calculated every time the currency weights, $w_{i,t}$, change to ensure index continuity. The calculation of $B_t$ is described in detail below.

In step 212, it is determined whether the competitive weights have changed. When the competitive weights have changed, a new multiplier $B_t$ may be determined to ensure the continuity in equation 1, in step 214. In one embodiment, $B_t$ is determined by the following equation:

$$B_t = B_{t-1} \cdot b_t, \quad (2)$$

where the variable $b_t$ can be expressed as $$b_t = \frac{\prod_{i=1}^{7} (1/S_{i,t})^{w_{i,t}}}{\prod_{i=1}^{7} (1/S_{i,t})^{w_{i,t-1}}} \quad (3)$$

The Federal Reserve typically publishes revised competitive weights in the beginning of the calendar year. In one embodiment, the competitive weights $w_{i,t}$ in equation (1) are adjusted on the first trading day in March of every year to provide additional transparency in calculating the value of a financial instrument. If the Federal Reserve publishes revised competitive weights during the year, in one embodiment, the competitive weights $w_{i,t}$ in equation (1) are adjusted on the first trading day of the second calendar month after the revision.

When the competitive weights have not changed or after step 212, control may return to step 204 during a subsequent time period to begin the process of determining the value of the financial instrument for that time period.

The method shown in FIG. 2 may be used to determine the value of financial instruments in the form of futures and/or options on futures contracts. In one embodiment, the calculation of the value of the futures and/or options on futures contracts may be performed by an exchange, such as the Chicago Mercantile Exchange, Inc. The exchange may also perform other functions such as listing the financial instruments for trading, receiving bids and offers for the financial instruments and matching bids and offers for the financial instruments. Conventional settlement services for executed trades of the financial instrument may also be performed by the exchange. The exchange may also provide notice of matched trades to traders associated with matched bids and offers.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention.

What is claimed is:

1. A non-transitory computer-readable medium on an exchange computer system having computer-executable instructions that when executed by a processor perform the method comprising:
   (a) listing for trading on an exchange a financial instrument having a composition calculated by the method comprising:
      (i) determining from a data market module of the exchange computer system exchange rates for a group of foreign currencies;
      (ii) determining competitive weights for each of the foreign currencies such that each weight reflects competition between the goods of the United States and a country corresponding to the foreign currency in the markets of third countries as well as foreign currency trading patterns in international foreign exchange markets; and (iii) calculating a geometric average of the exchange rates with corresponding competitive weights using the formula:

$$\prod_{i=1}^{n} (1/S_{i,t})^{w_{i,t}},$$

where n is the number of foreign currencies $S_{i,t}$ is the exchange rate of currency i at time t, expressed in dollars per unit of foreign currency and $w_{i,t}$ is the competitive weight of currency i at time t;
(b) receiving bids and offers for the financial instrument at a order book module of the exchange computer system; and
(c) matching bids and offers for the financial instrument at a match engine of the exchange computer system.

2. The non-transitory computer-readable medium of claim 1, wherein the foreign currencies consist of the European Union euro, the Australian dollar, the Canadian dollar, the Japanese yen, the Swedish krona, the Swiss franc, and the United Kingdom pound.

3. The non-transitory computer-readable medium of claim 1, wherein (a) further includes (iv) multiplying the geometric average by a multiplier.

4. The non-transitory computer-readable medium of claim 3, wherein (iii) comprises using the formula:

$$\prod_{i=1}^{7} (1/S_{i,t})^{w_{i,t}},$$

where $S_{i,t}$ is the exchange rate of currency i at time t, expressed in dollars per unit of foreign currency and $w_{i,t}$ is the competitive weight of currency i at time t.

5. The non-transitory computer-readable medium of claim 3, wherein (a) further includes:
(v) calculating a new multiplier when the competitive weights are changed.

6. The non-transitory computer-readable medium of claim 5, wherein (v) comprises using the formula $$B_t = B_{t-1} \div \frac{\prod_{i=1}^{7} (1/S_{i,t})^{w_{i,t}}}{\prod_{i=1}^{7} (1/S_{i,t})^{w_{i,t-1}}}$$

where $S_{i,t}$ is the exchange rate of currency i at time t, expressed in dollars per unit of foreign currency, $w_{i,t}$ is the weight of currency i at time t, $B_t$ is the new multiplier and $B_{t-1}$ is the previous multiplier.

7. The non-transitory computer-readable medium of claim 1, wherein the competitive weights are published by the Board of Governors of the Federal Reserve.

8. The non-transitory computer-readable medium of claim 1, further including:
(d) providing settlement services for executed trades of the financial instrument.

9. The non-transitory computer-readable medium of claim 1 further comprising:
(e) providing notice of matched trades to traders associated with matched bids and offers.

10. The non-transitory computer-readable medium of claim 1, wherein the competitive weights are periodically recalculated.

11. A non-transitory computer-readable medium on an exchange computer system having computer-executable instructions that when executed by a processor perform a method of calculating the composition of a foreign currencies indexed financial instrument, the method comprising:
(a) determining exchange rates for a group of foreign currencies;
(b) determining competitive weights for each of the foreign currencies such that each weight reflects competition between the goods of the United States and a country corresponding to the foreign currency in the markets of third countries; and
(c) calculating a geometric average of the exchange rates with corresponding competitive weights using the formula:

$$\prod_{i=1}^{n} (1/S_{i,t})^{w_{i,t}},$$

where n is the number of foreign currencies $S_{i,t}$ is the exchange rate of currency i at time t, expressed in dollars per unit of foreign currency and $w_{i,t}$ is the competitive weight of currency i at time t.

12. The non-transitory computer-readable medium of claim 11, wherein the foreign currencies consist of the European Union Euro, the Australian dollar, the Canadian dollar, the Japanese yen, the Swedish krona, the Swiss franc, and the United Kingdom pound.

13. The non-transitory computer-readable medium of claim 11, further including (d) multiplying the geometric average by a multiplier.

14. The non-transitory computer-readable medium of claim 13, wherein (c) comprises using the formula:

$$\prod_{i=1}^{7} (1/S_{i,t})^{w_{i,t}},$$

where $$\prod_{k=1}^{n} (x_k)$$

is the product of $x_k$ as k ranges from 1 to n, $S_{i,t}$ is the exchange rate of currency i at time t, expressed in dollars per unit of foreign currency and $w_{i,t}$ is the competitive weight of currency i at time t.

15. The non-transitory computer-readable medium of claim 13, further including:
(e) calculating a new multiplier when the competitive weights are changed.

16. The non-transitory computer-readable medium of claim 15, wherein (e) comprises using the formula $$B_t = B_{t-1} \div \frac{\prod_{i=1}^{7} (1/S_{i,t})^{w_{i,t}}}{\prod_{i=1}^{7} (1/S_{i,t})^{w_{i,t-1}}}$$

where $S_{it}$ is the exchange rate of currency i at time t, expressed in dollars per unit of foreign currency, $w_{i,t}$ is the weight of currency i at time t, $B_t$ is the new multiplier and $B_{t-1}$ is the previous multiplier.

17. The non-transitory computer-readable medium of claim 11, wherein the competitive weights are published by the Federal Reserve.

18. A computer exchange system for trading a foreign currencies indexed financial instrument comprising: computer-readable medium containing computer-readable instructions for performing the steps comprising:
  (a) a market data module configured to receive exchange rates for a group of foreign currencies and (b) receiving competitive weights for each of the foreign currencies such that each weight reflects competition between the goods of the United States and a country corresponding to the foreign currency in the markets of third countries; and a processor configured to calculate a geometric average of the exchange rates with corresponding competitive weights using the formula:

$$\prod_{i=1}^{n} (1/S_{i,t})^{w_{i,t}},$$

where n is the number of foreign currencies $S_{it}$ is the exchange rate of currency i at time t, expressed in dollars per unit of foreign currency and $w_{i,t}$ is the competitive weight of currency i at time t.

* * * * *